United States Patent [19]

Burroughs

[11] 4,040,754
[45] Aug. 9, 1977

[54] CABLE ATTACHMENT

[76] Inventor: Elvin O. Burroughs, 81650 Lost Creek Road, Dexter, Oreg. 97431

[21] Appl. No.: 661,747

[22] Filed: Feb. 26, 1976

[51] Int. Cl.² .............................................. F16G 11/04
[52] U.S. Cl. ..................................... 403/16; 403/368; 403/374; 24/136 R; 174/79
[58] Field of Search ................ 403/368, 374, 409, 314, 403/211, 215, 16, 322; 24/136 R, 25; 339/273 R, 273 F; 174/79

[56] References Cited

U.S. PATENT DOCUMENTS

| 1,575,017 | 3/1926 | Swars ................................ 403/368 X |
| 2,220,203 | 11/1940 | Branin ............................... 403/368 X |
| 2,835,949 | 5/1958 | Wengen et al. ....................... 403/368 |
| 2,902,736 | 9/1959 | Hampe ............................. 403/374 X |

FOREIGN PATENT DOCUMENTS

| 457,376 | 1950 | Italy .................................... 24/136 K |
| 753,993 | 8/1956 | United Kingdom ................... 174/79 |

Primary Examiner—Andrew V. Kundrat
Attorney, Agent, or Firm—James D. Givnan, Jr.

[57] ABSTRACT

The attachment includes main and secondary members, both having cooperating surfaces inclined to the centerline of a cable segment to which they are attached. The main body member is lengthwise recessed to receive the cable segment. The attachment members, by reason of the cooperating surfaces, are adapted to be drawn into clamping engagement with the cable upon relative movement between the members.

1 Claim, 6 Drawing Figures

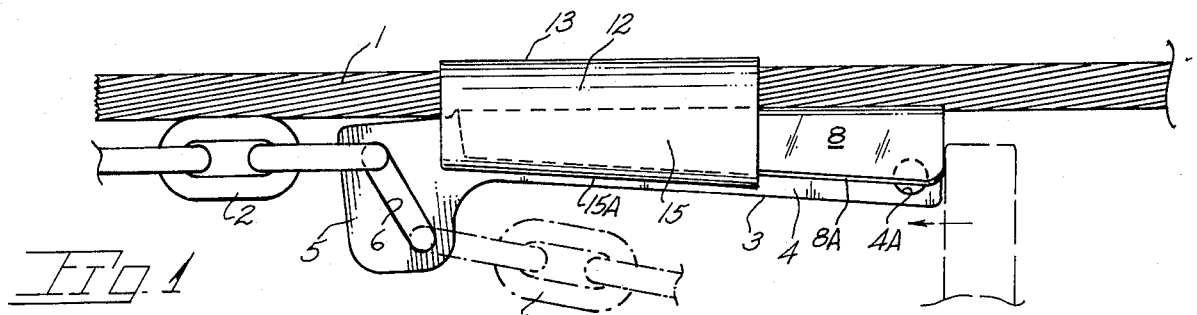
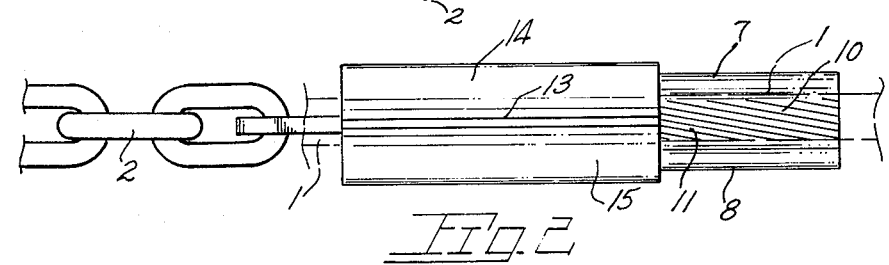
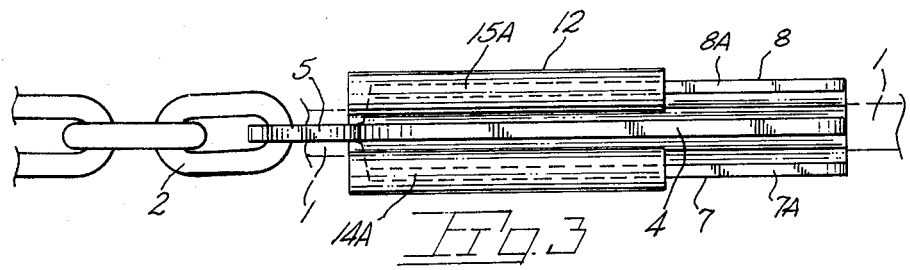
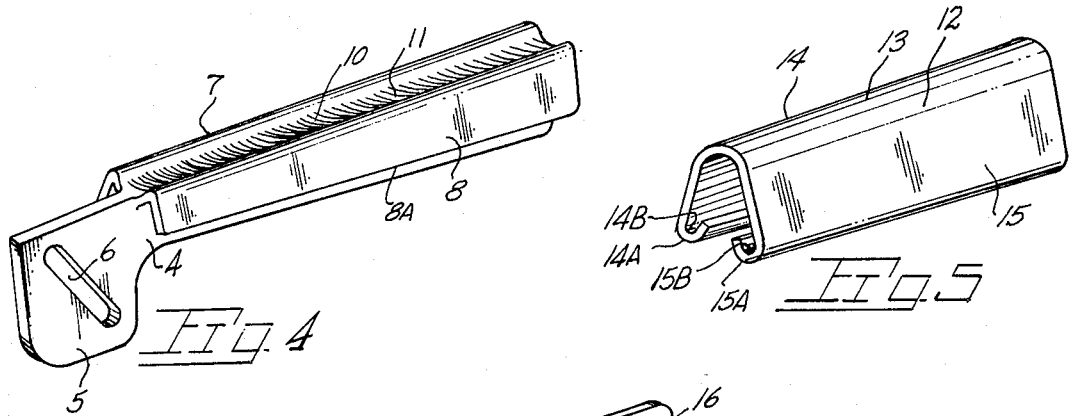
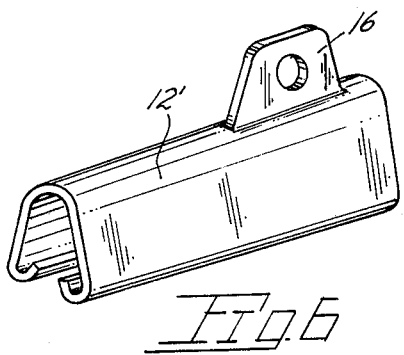

CABLE ATTACHMENT

BACKGROUND OF THE INVENTION

The present invention relates generally to cable fittings and the like and, more particularly to a cable attachment for wedged, locked engagement with a segment of wire rope or cable. The present attachment may serve to interconnect the cable segment with other elongate load bearing means, such as chains, to provide an arrangement useful in the binding of piled logs preparatory to shipment.

The attachment of any article to a length of cable is complicated by the smooth surface of the cable consisting of woven wire strands which presents a relatively smooth, hard surface. Well known in the prior art is the attachment of various types of fittings to cable by swaging, splicing and leading all being processes which are costly and normally must be accomplished within a machine shop. Efforts to provide cable attachments, for one reason or another, have not been widely adopted, with attachments of fittings to cables still being made in the above mentioned ways with high original cost as well as costly periodic replacement.

SUMMARY OF THE PRESENT INVENTION

The present invention is embodied within an attachment for wire rope or cable enabling the coupling of additional load bearing articles to the cable in a convenient manner. The costly attachment of eyes, ferrules and the like to cable for the purpose of facilitating attachment of the cable to chains, hooks and the like is avoided by use of the present cable attachment. Accordingly, a cable length need not be custom made to suit the task at hand but rather, in many instances, may fulfill the function of binding a load together simply by the application of the present attachment to one or both cable ends to facilitate the coupling of a locking device for tensioning said cable. A main body member of the present attachment is adapted for placement along a segment of the cable to be tensioned while a secondary or cooperating member serves to lock the cable in a wedged manner against said main body member. Cooperating inclined surfaces (inclined to the cable axis) on said members result in a wedging action of the members against the cable segment with relative movement between the two members resulting in same being drawn into snug frictional engagement with the cable.

Important objectives of the cable attachment include: the provision of a cable attachment conveniently applied to cables of different diameters; the provision of a cable attachment comprising but two members, both of which lend themselves to manufacture by economical forming methods and which are highly reliable by reason of their simplicity of design; the provision of a cable attachment rapidly applied to and removed from a cable segment; the provision of a cable attachment wherein the members securely grip and prevent spiral movement of the cable regardless of fluctuations in cable diameters resulting from cable tensioning forces; and the provision of a cable attachment wherein the main body member is shaped so as to permit a normally tensioned member to be repositioned and used for imparting a releasing force to said attachment.

BRIEF DESCRIPTION OF THE DRAWING

In the accompanying drawing:

FIG. 1 is a side elevational view of the present cable attachment operatively disposed on a cable end;

FIG. 2 is a plan view of FIG. 1 with the cable segment shown in phantom lines;

FIG. 3 is a bottom plan view of FIG. 1;

FIG. 4 is a perspective view of the main body of the cable attachment removed from the cable;

FIG. 5 is a perspective view of the secondary member of the cable attachment removed from the main body member; and FIG. 6 is a perspective view of a modified secondary member.

DETAILED DESCRIPTION OF THE PREFERRED EMBODIMENT

With continuing reference to the accompanying drawing wherein applied reference numerals indicate parts similarly identified in the following specification, the reference numeral 1 indicates a segment of a wire rope or cable such as of the type used to secure large, bulky loads e.g, stacked logs during transport. Reference numeral 2 indicates an associated member which may be tensioned along with the cable by means not shown. The present attachment has a wide range of uses; for example, the interconnecting of a cable to another type of tensioned member such as a chain to enable tensioning of the joined cable and chain by a load binder device about a load.

A main body member of the present cable attachment is indicated at 3 and includes a centrally disposed base component 4 extending lengthwise of said body member. Said central base portion terminates at one end in an enlarged head portion 5 provided with an elongate opening 6 inclined rearwardly and downwardly for later elaborated purposes. Extending lengthwise along body portion 4 and disposed outwardly therefrom are downwardly diverging appendages 7 and 8, each terminating outwardly in surfaces 7A and 8A. A cable receiving inset area is indicated at 10 defined by a lengthwise recessed surface 11 for purposes of enhancing cable engagement. Surface 11 may be provided with an irregular or uneven surface to facilitate cable engagement. Surfaces 7A-8A are inclined with respect to cable receiving inset area 10 and hence the axis of a cable segment thereon. An opening at 4A in the main body member provides a release line attachment point, if so desired.

A secondary member 12, as best viewed in FIG. 5, is of open configuration having an arcuate central portion 13 with downwardly diverging walls 14 and 15. Said walls terminate in upwardly turned, lengthwise extending side edges 14A and 15A which provide inner surfaces 14B and 15B which, upon assembly of the attachment members, slidably engage edges 7A-8A. As viewed in FIG. 1, relative sliding movement between surfaces 14B-15B and edges 7A-8A will cause said secondary member to be drawn into gripping engagement with the enclosed cable segment. Final locking of the two members is accomplished by endwise rapping (FIG. 1) of the main member with a hammer-like blow. Irregular surface 11 defining the lengthwise extending recess of the main body member is accordingly urged into intimate engagement with the wire rope strands. For release of the members from the cable, the cable and tensioned chain (or other load binding instrumentality) must be relaxed by release of the associated locking mechanism whereupon a hammer-like blow to head 5 of main body member 3 will result in separation of the attachment members. Release may also be affected by moving relaxed chain member to the lower end of inclined opening 6 as shown in the broken line position of FIG. 1 followed by jerking of the chain as shown. For remotely releasing the attachment, opening 4A in the main body member may receive a release line by which a sudden force may be imparted for release purposes.

In FIG. 6 I show a slightly modified form of a secondary member at 12' wherein said member is provided with an apertured ear 16 for the securement by suitable means of the remaining end of the same cable secured between the attachment members. Accordingly the present attachment may be used to secure a tensioned cable "wrapper" about a log load.

While I have shown but a few embodiments of the invention, it will be apparent to those skilled in the art that the invention may be embodied still otherwise without departing from the spirit and scope of the invention.

Having thus described the invention, what is desired to be secured under a Letters Patent is:

1. A cable attachment adapted for wedged engagement with a segment of tensioned cable, said attachment comprising, a main body member for lengthwise abutment against said cable segment, said body member having a lengthwise orientated base and a pair of surfaces offset from and inclined relative to the axis of said cable segment, an enlarged head portion at one end of said base and at the lower end of the incline defining an elongate opening inclined to the cable axis within which a tensionable member is retained, a secondary member adapted for engagement with said main member and having lengthwise orientated surfaces for coaction with the pair of inclined surfaces on said main body whereby relative movement between said members will draw said members toward one another and into gripping engagement with said cable segment, and said main body member and secondary member adapted for disengagement by sudden impacting of the tensionable member against that part of the head portion defining the outer end of said elongate opening.

* * * * *